US009869355B2

(12) United States Patent
Pociask et al.

(10) Patent No.: US 9,869,355 B2
(45) Date of Patent: *Jan. 16, 2018

(54) ADJUSTABLE CONTROL OF POWER TAKE-OFF SUBSYSTEM DAMPING AND SYSTEM THEREOF

(71) Applicant: Allison Transmission. Inc., Indianapolis, IN (US)

(72) Inventors: Michael B. Pociask, Plainfield, IN (US); Jorge F. Briceno, Brownsburg, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/712,572

(22) Filed: May 14, 2015

(65) Prior Publication Data

US 2015/0247540 A1    Sep. 3, 2015

Related U.S. Application Data

(62) Division of application No. 14/082,367, filed on Nov. 18, 2013, now Pat. No. 9,079,493.

(Continued)

(51) Int. Cl.
*F16D 48/06* (2006.01)
*B60K 25/06* (2006.01)
(Continued)

(52) U.S. Cl.
CPC ............ *F16D 48/066* (2013.01); *B60K 25/06* (2013.01); *B60W 10/02* (2013.01);
(Continued)

(58) Field of Classification Search
None
See application file for complete search history.

(56) References Cited

U.S. PATENT DOCUMENTS 6,060,981 A    5/2000  Landes
9,079,493 B2 * 7/2015  Pociask ................ B60W 10/02
(Continued)

FOREIGN PATENT DOCUMENTS

JP        09226410 A    9/1997
KR    1020040097480 A   11/2004

OTHER PUBLICATIONS

International Searching Authority, International Preliminary Report on Patentability and Written Opinion, dated May 19, 2015; 8 pages.

*Primary Examiner* — Edwin A Young
(74) *Attorney, Agent, or Firm* — Taft Stettinius & Hollister LLP; Stephen F. Rost

(57) ABSTRACT

The present disclosure provides a method for controlling a power take-off assembly. The method includes providing a drive unit, a transmission having an output, a speed sensor, a controller including a memory unit and a processor, and the power take-off assembly including a clutch and a solenoid. The method also includes storing a first threshold in the memory unit, determining a current input speed of the drive unit with the speed sensor, and comparing the current input speed to the first threshold. The method further includes controlling an amount of hydraulic pressure supplied to the clutch and engaging the clutch.

20 Claims, 4 Drawing Sheets

Related U.S. Application Data

(60) Provisional application No. 61/727,775, filed on Nov. 19, 2012.

(51) Int. Cl.
*B60W 10/02* (2006.01)
*B60W 30/188* (2012.01)

(52) U.S. Cl.
CPC . *B60W 30/1888* (2013.01); *B60W 2510/0638* (2013.01); *B60W 2510/305* (2013.01); *B60Y 2300/205* (2013.01); *B60Y 2300/423* (2013.01); *F16D 2500/10412* (2013.01); *F16D 2500/10437* (2013.01); *F16D 2500/3067* (2013.01); *F16D 2500/70406* (2013.01); *F16D 2500/70605* (2013.01)

(56) References Cited

U.S. PATENT DOCUMENTS

| | | | |
|---|---|---|---|
| 2003/0051969 A1* | 3/2003 | Reinards | B60K 17/28 192/103 F |
| 2005/0211528 A1* | 9/2005 | Hou | B60W 30/1888 192/85.63 |
| 2009/0235627 A1 | 9/2009 | Silbernagel et al. | |
| 2011/0021301 A1* | 1/2011 | Asano | F16D 25/123 475/86 |
| 2012/0221214 A1 | 8/2012 | Husson | |

* cited by examiner

ADJUSTABLE CONTROL OF POWER TAKE-OFF SUBSYSTEM DAMPING AND SYSTEM THEREOF

CROSS-REFERENCE TO RELATED APPLICATIONS

This application is a divisional application of U.S. patent application Ser. No. 14/082,367, filed Nov. 18, 2013, which claims priority to U.S. Provisional Application Ser. No. 61/727,775, filed Nov. 19, 2012 and entitled "Adjustable Control Of Power Take-Off SubSystem Damping," the disclosures of which are hereby incorporated by reference in their entirety.

FIELD OF THE DISCLOSURE

The present disclosure relates to a system and method for damping noise, and in particular to a system and method of adjustably controlling a power take-off assembly to reduce noise at a no-load idle condition.

BACKGROUND

Conventional internal combustion engines can create significant noise when started and running, particularly during idle conditions. Over time, original equipment manufacturers (OEMs) have desired more stringent noise levels from these engines due to concerns expressed by vehicle owners, whom desire quieter vehicles. As a result, expectations continue to get stricter for noise production.

Customers also choose new vehicles that have power take-off capability. A power take-off (PTO) device can be attached to a component of the vehicle, e.g., transmission. The PTO can receive power from an operating source, such as an engine, and in turn provide power to an attachment or separate machine. In this manner, the PTO allows implements to draw energy from the engine. In some applications, the PTO can be connected to a vehicle's transmission which is driven by the vehicle's engine. The PTO can be controlled mechanically, hydraulically, or electrically.

SUMMARY

In one embodiment of the present disclosure, a method is provided for controlling a power take-off assembly. The method includes providing a drive unit, a transmission including an output, a speed sensor, a controller including a memory unit and a processor, and the power take-off assembly including a clutch, and a solenoid; storing a first threshold in the memory unit; determining a current input speed of the drive unit with the speed sensor; comparing the current input speed to the first threshold; controlling an amount of hydraulic pressure supplied to the clutch; and engaging the clutch.

In one example of this embodiment, the controlling step is performed if the current input speed is less than the first threshold. In a second example, the method includes storing a second threshold in the memory unit of the controller; determining a load induced on the drive unit; and comparing the load to the second threshold. In a third example, the controlling step is performed if the current input speed is less than the first threshold and the load is less than the second threshold. In a fourth example, the controlling step comprises energizing the solenoid. In a fifth example, the controlling step comprises energizing the solenoid to supply full hydraulic pressure to the clutch.

In a sixth example, the controlling step comprises energizing the solenoid to supply partial hydraulic pressure to the clutch. In a seventh example, the method includes detecting if a signal is received from an operator control switch and performing the controlling and engaging steps if there is no detected signal received. In an eighth example, the method includes providing a second solenoid; energizing one of the first solenoid and the second solenoid; and de-energizing the other of the first solenoid and the second solenoid. In a ninth example, the method can also include storing a set of instructions in the memory unit of the controller for slipping the clutch; repeatedly performing the determining and comparing steps; and executing the set of instructions with the processor so long as the current input speed remains below the first threshold.

In another embodiment of this disclosure, a vehicle includes a drive unit for producing torque, the drive unit including an output; a transmission including an input, a first output, and a second output, wherein the input is coupled to the output of the drive unit; a controller including a memory unit and a processor, the controller electrically coupled to the transmission; a power take-off assembly coupled to the second output, the power take-off assembly including a clutch and a solenoid electrically coupled to the controller; wherein, a set of instructions is stored in the memory unit of the controller, the set of instructions being executable by the processor to receive a current input speed of the drive unit, compare the current input speed to a first threshold, determine if the current input speed is less than the first threshold, energize or de-energize the solenoid, and operably control an amount of hydraulic pressure applied to the clutch.

In one example of this embodiment, the set of instructions stored in the memory unit are further executable by the processor to receive a load on the drive unit, compare the load to a second threshold, and determine if the load is less than the second threshold. In a second example, the vehicle includes an operator control switch electrically coupled to the controller, the operator control switch configured to be triggered for enabling and disabling the power take-off assembly; wherein, the set of instructions stored in the memory unit are further executable by the processor to detect if a signal is received from the operator control switch and operably control the amount of hydraulic pressure applied to the clutch if no signal is detected.

In a third example, the set of instructions stored in the memory unit are further executable by the processor to energize the solenoid to apply a maximum amount of hydraulic pressure to the clutch. In a fourth example, the set of instructions stored in the memory unit are further executable by the processor to energize the solenoid to apply a reduced amount of hydraulic pressure to the clutch. In a fifth example, the power take-off assembly comprises an input shaft; an output shaft; a first drive gear rotatably driven by the second output; a first driven gear rotatably coupled to the input shaft, wherein the first driven gear is rotatably driven by the first drive gear; a second drive gear rotatably coupled to the input shaft; and a second driven gear rotatably coupled to the output shaft, wherein the second driven gear is rotatably driven by the second drive gear.

In a different embodiment, a method is provided for controlling a hydraulically-controllable clutch of a power take-off assembly. The method includes providing a drive unit, a transmission including an output, a speed sensor, a controller including a memory unit and a processor, and the power take-off assembly including a clutch and a solenoid; storing a first threshold and a second threshold in the memory unit; determining a current input speed of the drive unit with the speed sensor; determining a load induced on the drive unit; comparing the current input speed to the first threshold; comparing the load to the second threshold; controlling an amount of hydraulic pressure supplied to the clutch; and engaging the clutch based on the amount of hydraulic pressure supplied thereto.

In one example of this embodiment, the controlling step is performed if the current input speed is less than the first threshold, the load is less than the second threshold, and no signal indicative of enabling the power take-off assembly is received from the operator control switch. In a second example, the controlling step comprises energizing or de-energizing the solenoid. In a third example, the method can include storing a set of instructions in the memory unit of the controller for slipping the clutch; repeatedly performing the determining a current input speed step of the drive unit with the speed sensor, determining a load induced on the drive unit, comparing the current input speed to the first threshold, comparing the current input speed to the first threshold, and detecting if a signal indicative of enabling the power take-off assembly is received from the operator control switch; and executing the set of instructions with the processor so long as the current input speed remains below the first threshold, the load remains below the second threshold, and no signal indicative of enabling the power take-off assembly is received from the operator control switch.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
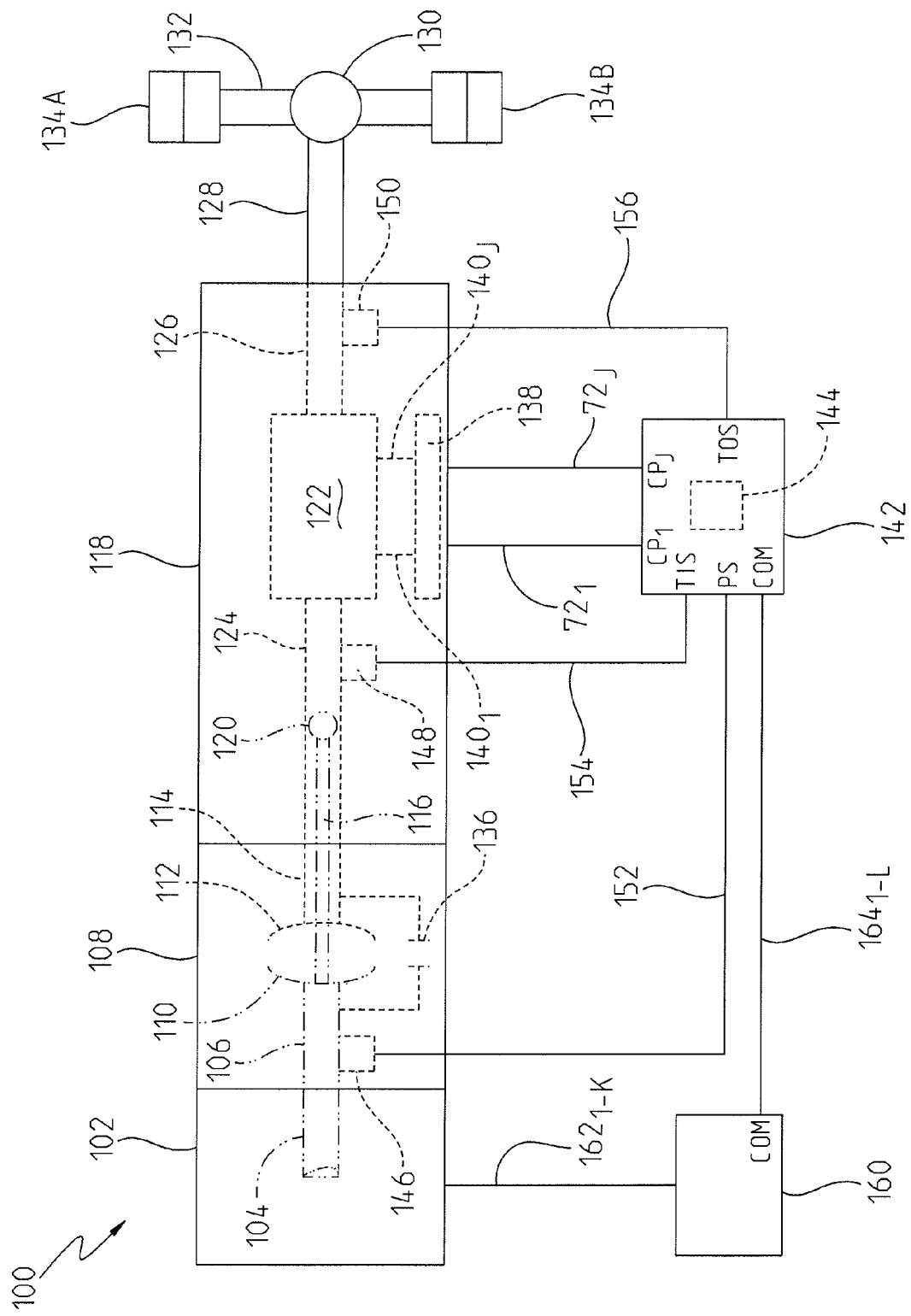
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72j$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

In one example of the vehicular system 100, a PTO (not shown) can be connected to the transmission via an input gearset for receiving mechanical power. The PTO can also include an internal, transfer gearset. Each gearset (i.e., the input and transfer) can include a first and a second gear for delivering and receiving power, respectively. With respect to the input gearset, a corresponding gear or mechanism of the PTO can interact with a gear or mechanism of the transmission to receive and transfer power. The interacting gears of either gearset, however, can create a low load or speed rattle noise due to the inherent backlash between gears. The noise can be particularly noticeable when the engine is operating at a low speed or idle condition and when there is no load on the PTO. To reduce or overcome this noise, engine or transmission designs, specifically their mass/elastic systems, can be changed or additional hardware (e.g., an isolator gear) may be incorporated into the current design. These changes, which can affect the mass/elastic system, can be very costly and have a limited effectiveness to this particular PTO powertrain mass/elastic combination.

Therefore, a need exists for a more cost effective and global solution by controlling the damping within the power take-off subsystem to reduce or eliminate noise at or approximate to a no-load idle condition.

Figure 2:
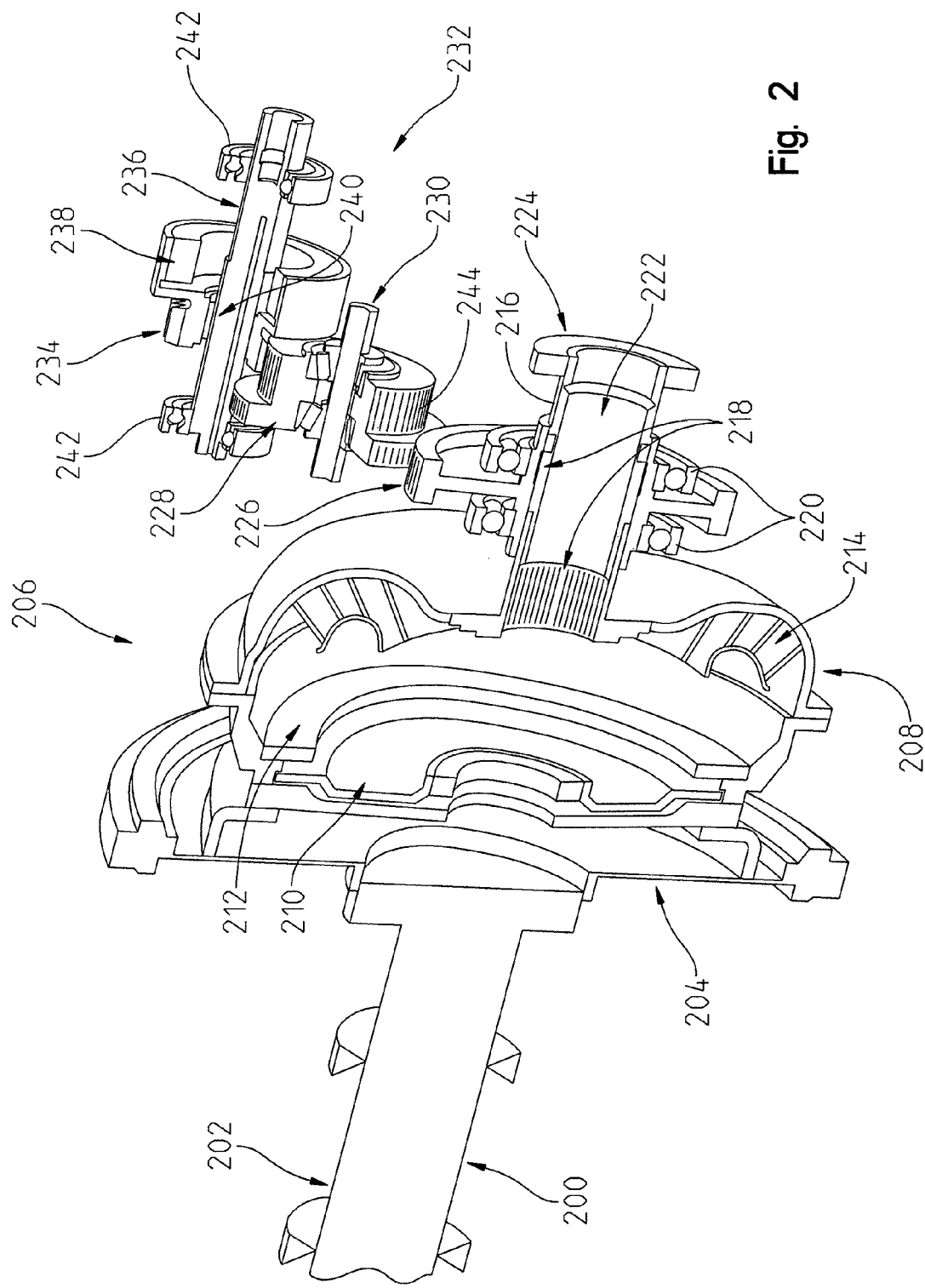
FIG. 2 is a perspective view of a portion of a transmission assembly and power take-off assembly.

Referring to FIG. 2, one example is shown of a transmission and PTO assembly. As described above, a PTO is a device that can redirect a portion of the input power provided by a prime mover (e.g., an engine) to tools, work implements, or accessories for the purpose of performing functions which are secondary to the purpose for the power pack. For instance, the PTO could provide power to a hydraulic pump. In a hybrid system application, however, power or torque can flow in both directions (i.e., between inputs and outputs, rather than from an input to an output).

In FIG. 2, a prime mover 200 is provided having a propulsion shaft 202 for delivering power to a transmission assembly 206. The transmission assembly 206 can be mounted to a flex plate 204 of the prime mover 200. The transmission assembly can include a torque converter 208 coupled to the shaft 202. The propulsion shaft 202 in FIG. 2 can correspond with the output shaft 104 of FIG. 1. The torque converter 208 can have a piston 210, back plate 212 and pump 214 operably disposed in an outer shell for torque multiplication. The torque converter 208 can be coupled to a drive shaft 216 of the transmission assembly 206. Referring to FIG. 1, the drive shaft 216 can correspond with shaft 116.

The drive shaft 216, or PTO drive shaft, can include splines 218 for coupling to the torque converter 208 and a PTO drive gear 226. At an end opposite of the torque converter 208, a pump 224 can be coupled to the drive shaft 216. A portion of a drive hub 222 is positioned near the pump 224. The drive gear 226 can be coupled to the drive shaft 216 for transferring torque to a power take-off (PTO) assembly 232. The drive gear 226 is disposed between a pair of bearings 220 as shown.

The PTO assembly 232 can include an input gearset as shown in FIG. 2. The input gearset includes a first input gear 228 coupled to the drive gear 226. In particular, the teeth of the first input gear 228 can be coupled with the drive gear 226 of the transmission assembly 206 so that torque is transferred to the PTO assembly 232 from the transmission assembly 206. The first input gear 228 can be disposed about a spindle 230 which can further transfer torque to an output gearset. The output gearset, which forms part of the PTO assembly 232, can include a second input gear 244 that is disposed about the spindle 230 adjacent to the first input gear 228. The second input gear 244 can be further coupled to an output gear 234 of the PTO assembly 232. The output gear 234 can be coupled to an output shaft 236 of the PTO assembly 232 to deliver torque to an implement or attachment coupled thereto. Moreover, bearings and seals 240, 242 can provide lubrication and support to the gears and shafts of the PTO assembly 232.

As further shown in FIG. 2, the PTO assembly 232 can disconnect its input gearset from its output shaft by including an electrically controlled hydraulic clutch 238 (i.e., a PTO clutch 238) instead of a mechanical or sliding gear type. This power shift PTO assembly 232, which has the internal hydraulic clutch 238, can therefore be engaged independently from, but in coordination with, the operating conditions performed by the transmission power pack. The PTO can include a control system that is independent of the control system of the transmission. However, via electronic communications between the power pack, the operator, and the PTO, the PTO is engaged or disengaged when desired by the operator, and under the appropriate conditions with the power pack operation.

Referring to FIG. 2, power can be transferred between the power pack of the transmission assembly 206 and the PTO assembly 232 via the input gearset (i.e., gears 226, 228), and then, transferred to the output shaft 236 of the PTO assembly 232 by the output gearset (i.e., gears 244, 234). Alternatively, transfer gearsets can be provided to allow the relationship between the speed of the prime mover 200 and the output shaft 236 of the PTO assembly 232 to be appropriately selected depending on the specific requirements and operational conditions for the implements to be driven by the PTO assembly 232. The transfer of power between the prime mover 200, the power pack of the transmission assembly 206, and PTO assembly 232 can be a direct mechanical connection in order for the operator to directly control the output speed of the PTO. However, in other examples, the transfer of power can be via an indirect mechanical connection for controlling the PTO. For instance, in one such embodiment, the indirect connection can be made only when the lockup clutch 136 is engaged.

The requirement for a direct drive connection may also allow the variable rotation and torque characteristics, which are inherent to internal combustion prime movers 200 and created by the independent firing of each of its cylinders, to also be transmitted through the input gearset and output gearset of the PTO assembly 232. Since most gearsets also inherently have some amount of backlash, this uneven or vibratory rotational movement can cause these gearsets to rattle when the PTO assembly 232 is not engaged and is not transmitting a torque load to the implement which it drives. This rattle noise can be undesirable and may raise the level of noise generated by the overall power pack installation when it is at an idle, no load condition.

As described above, hardware and design features within the power pack which may reduce the level of this noise to near acceptable levels can be costly and difficult to implement within existing power pack designs. Moreover, to reduce the noise a design change must be robust enough to account for the characteristics of existing and future prime movers, numerous mass/elastic configurations for the power pack as well as the various available PTO designs, and the load requirements for the implements to be driven. However, many hardware or design changes are often limited to the configurations for which they were designed, or in other words, are generally "tuned" to the characteristics of the prime mover and the mass/elastic systems for which they were designed.

In addition, the internal drag or torque required to turn the PTO assembly 232 at a no load, idle condition can vary depending on the internal PTO assembly design and production process control tolerances for items such as bearing clearances, oil shaft seal contacts, and clutch clearance. Furthermore, because of fuel economy considerations, these features are typically optimized in order to reduce the amount of PTO damping which conflicts with the design direction needed to resolve the noise issue.

Thus, to reduce the noise without altering the design of the power pack of the transmission assembly 206 or the PTO assembly 232, the internal PTO hydraulic clutch 238 can be electrically controlled. In doing so, the clutch 238 can be partially applied to provide an adequate amount of drag to prevent unacceptable gear rattle. For instance, in one non-limiting example, approximately 8 psi of clutch pressure can be hydraulically applied to the PTO clutch 238 to induce about 3.6 N-m of drag in the PTO hydraulic clutch 238. Under these conditions, the partial apply can reduce the noise level to an acceptable level.

Figure 3:
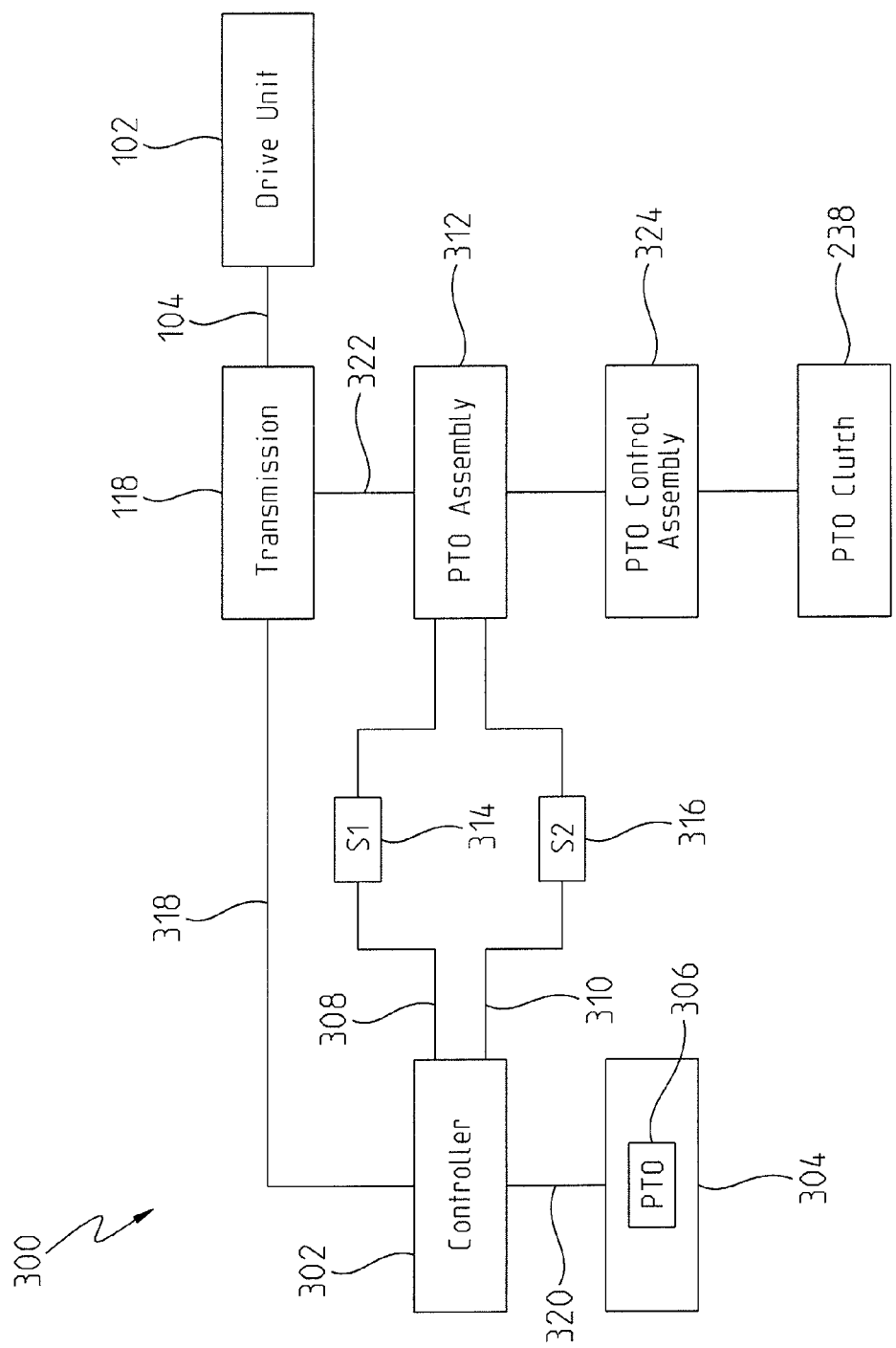
FIG. 3 is a control schematic for controlling the clutch of the power take-off assembly of FIG. 2.

Turning to FIG. 3, a control schematic 300 illustrates an embodiment for controlling the clutch pressure of the PTO clutch 238. Here, a controller 302 is shown having at least a first wire 308 and a second wire 310 electrically coupled to a PTO assembly 312. The controller 302 can perform in a similar manner as the transmission control circuit 142 of FIG. 1. In other words, the controller 302 can include a memory unit for storing a set of instructions that can be executed by a processor. The controller 302 can store torque curves, look-up tables, shift curves, and any other algorithms, methods, processes, or set of instructions for controlling the PTO clutch 238. The controller 302 can be in electrical communication with the transmission 118 via a first communication link 318.

The controller 302 can also be in electrical communication with operator controls 304 via a second communication link 320. The operator controls 304 can include a manual shift selector 304, for example, that includes a plurality of user controls. The operator controls 304 can include a plurality of switches, buttons, levers, joysticks, pedals, etc. In FIG. 3, one of the plurality of operator controls can include a PTO control button 306. The operator controls can be disposed in a cab of a vehicle to allow the vehicle operator to manually select one or more of the user control buttons on the operator controls 304. In particular, the vehicle operator can select the PTO control button 306 to transfer torque from a drive unit to the output of the PTO assembly 312 via the transmission 118 and a connection 322 between the transmission 118 and PTO assembly 312. When the PTO control button 306 is triggered to an active or enabled state, a signal is electrically transmitted to the controller 302 to indicate that the operator desires to activate or enable the PTO assembly 312. There can be specific circumstances and conditions under which the PTO assembly 312 can be enabled, and the controller 302 can store these conditions in its memory unit. Thus, when the PTO control button 306 is triggered and the controller 302 receives the indicative signal from the operator controls 304, the controller 302 can determine whether appropriate conditions are satisfied before activating or enabling the PTO assembly 312.

The PTO assembly 312 can include an electrical control system in the form of an adjustable solenoid, pressure switch, valve, etc. In one example, the control system can include two single stage solenoids. In another example, the control system can include a variable bleed solenoid. In a further example, the control system can include a two-stage solenoid. In the illustrated example of FIG. 3, the control system can include a first solenoid 314 and a second solenoid 316. Each of the first solenoid 314 and second solenoid 316 can be electrically coupled to the controller 302 via the electrical wires 308, 310. An electrical signal can be submitted to or from the controller 302 and PTO assembly 312 to enable or disable the solenoids.

The first solenoid 314 can be electrically enabled during a full power condition and the second solenoid 316 can be electrically enabled during a partial power condition. For purposes of this disclosure, the "full power condition" may refer to when a full clutch pressure is applied to the PTO clutch 238 to deliver mechanical power to the PTO output and mechanically drive an attachment or implement coupled to the PTO assembly 312. Moreover, the "partial power condition" may refer to when a partial clutch pressure is applied to the clutch 238 to create drag in the clutch for reducing the noise output at a no-load, idle condition.

The clutch pressure can be supplied by a PTO control assembly 324 of the PTO assembly 312. The PTO control assembly 324 can include valves, solenoids, etc. for adjustably controlling the amount of hydraulic pressure supplied to the PTO clutch 238. The PTO control assembly 324 can be operably controlled based on the electrical state of the first solenoid 314 and the second solenoid 316. This can allow for adjustable control of the amount of drag in the clutch for different applications. As such, the amount of damping can be adjustably controlled by the amount of clutch pressure commanded and delivered to the control assembly 324 of the PTO assembly 312. In this embodiment, the controller 302 not only can supply a signal for the normal operation of the PTO but can also supply an additional signal to the PTO control assembly 324 when drag is no longer required.

For example, once engine or input speed exceeds a threshold speed, e.g., 850 RPM, a signal can be communicated to the control assembly 324 of the PTO assembly 312 to disable the partial apply and clutch slipping. This may be desirable to prevent excessive fuel economy loss.

The PTO clutch 238 can be designed to handle different periods of slipping over time during the appropriate conditions (i.e., low speeds at or near idle and under no implement load). Clutch friction plates, for example, have been designed with a carbon fiber material and used in the automotive industry for several years in order to prevent transmitting the same uneven torque and input rotation from internal combustion engines which causes torsional activity and damage within vehicle transmissions. As a result, similar carbon fiber friction material may be incorporated into the PTO clutch design to enable the appropriate amount of clutch slipping to reduce noise at or near a no-load, idle condition.

Figure 4:
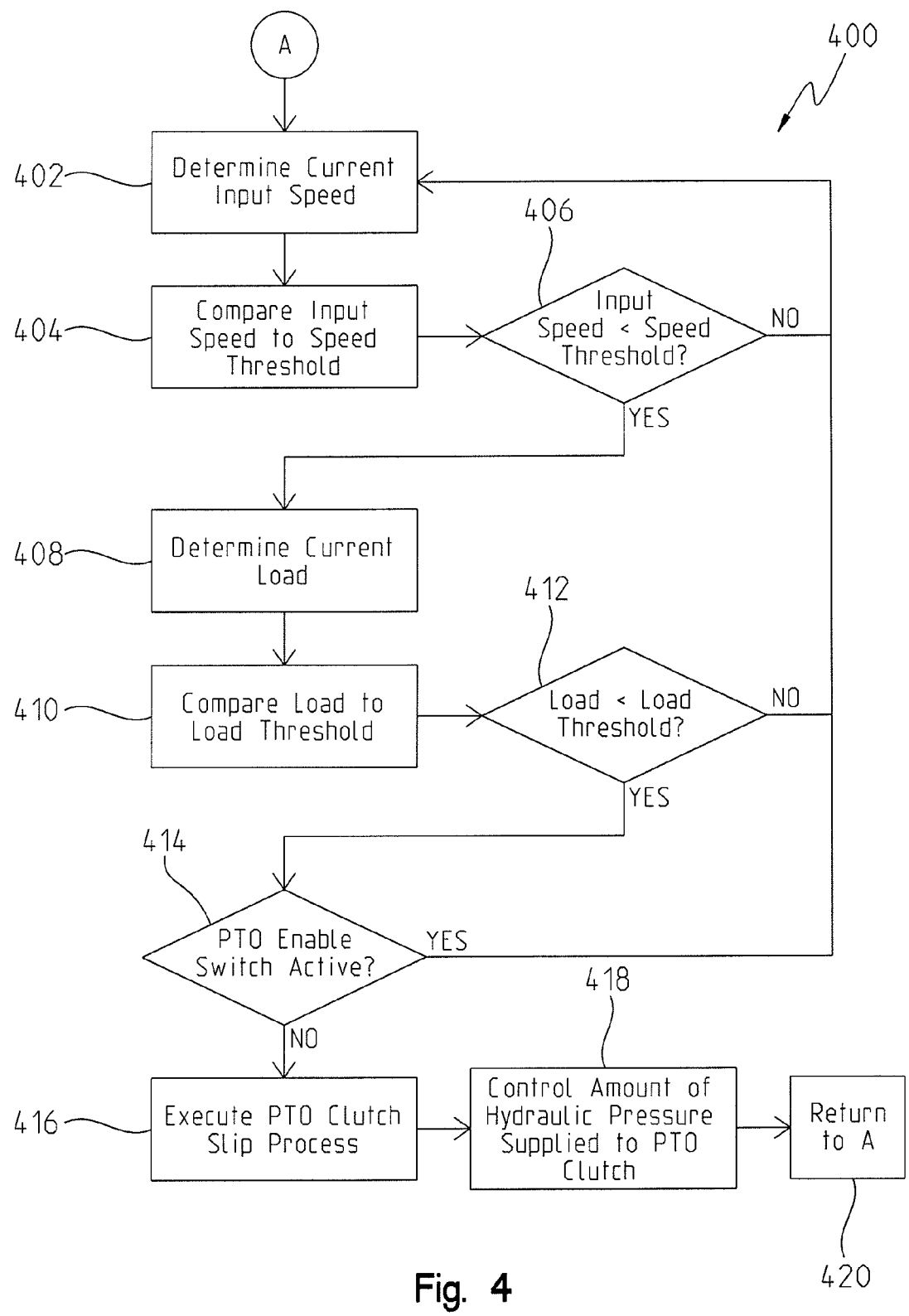
FIG. 4 is a method of controlling the power take-off assembly of FIG. 2.

Referring to FIG. 4, an example is provided of a method 400 for controlling the amount of hydraulic pressure supplied to the PTO clutch 238. The method 400 can include a plurality of blocks that are stored in the memory unit and executed by the processor in the controller 302 for operably controlling the PTO clutch 238. The plurality of blocks illustrated in FIG. 4 is not intended to be limiting, as one different example may include fewer blocks and a second different example may include additional blocks.

In any event, the method 400 can include a first block 402 that is executed by the processor to determine a current input speed of the drive unit 102. Here, the controller 302, which can take a form similar to that of the transmission control circuit 142 of FIG. 1, can receive input speed over a signal path 164, such as J-1939. In another example, a speed sensor 146 can detect the input speed of the drive unit 102 and send it to the controller 302 via a communication link 152. There can be other conventional means for receiving input speed so that the processor is able to execute block 402.

Once block 402 is executed, the method 400 can advance to block 404 where the processor can execute block 404 by comparing the current input speed of the drive unit 102 with a speed threshold. The speed threshold can be a single value or a range of values stored in the memory unit of the controller 302. Alternatively, the speed threshold may be dependent on various factors and therefore is determined from a look-up table, curve, etc. Once the controller 302 determines the speed threshold, the processor can compare the current input speed to the speed threshold in block 404. Moreover, the processor can execute block 406 by determining whether the current input speed is less than the speed threshold. In this manner, the controller 302 can determine whether the drive unit is operating at or near an idle condition. In one non-limiting example, the speed threshold can be 850 RPM. If the current input speed is less than speed threshold, the method can advance to block 408. If, however, the current speed is greater than the speed threshold, the method can return to block 402 and repeat the conditions set forth therein.

In block 408, the controller 302 can determine a current load on the drive unit 102. The load can be determined by any conventional means, including receiving inputs from different sensors, measuring the load, estimating the load, etc. An inclinometer, for example, can measure road grade and send a signal to the controller 302 with the measured road grade. In another aspect, the load can be determined as a function of throttle position or a percentage by which an accelerator pedal is depressed. In FIG. 3, the controller 302 can receive throttle position from a throttle input source, which can be coupled to the drive unit control circuit 160 of FIG. 1 for transmitting throttle data over a datalink (e.g., signal path 164). Examples of a conventional datalink include J1587 datalink, J1939 datalink, IESCAN datalink, Hardwire TPS (throttle position sensor) to TCM, and Hardwire PWM (pulse width modulation) to TCM. Unlike drive unit torque data, for example, which is communicated from the ECM to the TCM, throttle data can be communicated over the datalink and is not limited to a particular drive unit or engine/transmission configuration. Instead, the datalink can be adapted to most vehicle setups.

In any event, once the current load or throttle position is known, the method 400 can advance to block 410 where the processor compares the load or throttle position to a different threshold (e.g., load or throttle threshold). The load or throttle threshold can be stored in the memory unit of the controller 302 in a manner similar to that of the speed threshold. The result of block 410 is further determined in block 412. Here, if the load or throttle is less than the load or throttle threshold, the controller 302 can determine that there is no load or that the actual throttle position is less than a predefined amount (e.g., percentage), or an approximately small load, on the drive unit. In this case, the method 400 can advance to block 414. In the event the load is greater than the load threshold in block 412, the method 400 can return to block 402.

In block 414, the controller 302 can determine whether a signal has been triggered from the PTO control button or switch 306 to request an enablement or activation of the PTO assembly 312. If the PTO control button or switch 306 has been triggered to an enabled or active state, the controller 302 can either decide whether to activate the PTO assembly 312 (based on the conditions set forth above) or maintain the PTO assembly 312 disabled. In any event, if the PTO control button 306 is enabled, method 400 can advance to block 402. Alternatively, if the PTO control button 306 remains disabled, method 400 can advance to block 416.

Although method 400 shows blocks 408, 410, 412, and 414, in other examples the method 400 may only determine input speed in block 402 and compare it to the speed threshold in block 404. Once the method advances to block 416, the processor can execute block 416 by further executing a PTO clutch slip process which is stored in the memory unit. The clutch slip process can desirably control the amount of hydraulic pressure supplied to the PTO clutch 418. Once the PTO clutch slip process is enabled in block 416, the method 400 can advance to block 418 where the controller 302 can control the amount of pressure supplied to the PTO clutch 238 by energizing and de-energizing the first solenoid 314 and the second solenoid 316.

As described above, the first solenoid 314 can be electrically enabled during a full power condition and the second solenoid 316 can be electrically enabled during a partial power condition. Thus, when the controller 302 determines a condition equivalent to full clutch pressure is needed, the first solenoid 314 can be energized. When it is more desirable to slip the clutch 238, and thus reduce the noise from the PTO assembly 312, the controller 302 can energize the second solenoid 316. When the second solenoid 316 is energized, the partial or reduced clutch pressure applied to the PTO clutch 238 can create sufficient drag in the clutch for reducing the noise output at an approximate no-load, idle condition.

Method 400 can advance to block 420 before, during, or after the execution of block 418. In particular, in block 420, the method returns to block 402 where the controller 302 determines the current input speed of the drive unit 302. In this manner, the controller 302 can repeatedly and continuously execute blocks 402, 404, and 406 to ensure that the drive unit is at or near the idle condition. Moreover, the controller can repeatedly and continuously monitor the load on the drive unit in blocks 408, 410, and 412 to ensure that the drive unit remains substantially unloaded and also monitor the state of the PTO control button 306 in block 414 as method 400 is executed. In the event the conditions set forth in either block 406 or block 412 is no longer true, or the PTO control button 306 is enabled, the second solenoid 316 can be de-energized and the PTO clutch 238 can either be controlled under full hydraulic pressure or no hydraulic pressure.

In a related embodiment, the PTO assembly 312 can include only a single variable bleed or variable control mechanism. The variable control mechanism can be a solenoid or other mechanism for controlling an electric-to-hydraulic control PTO clutch 238. In this embodiment, the amount of current or voltage supplied by the controller 302 to the variable control mechanism can control the amount of hydraulic pressure supplied to the PTO clutch 236. In other words, a lower current or voltage may induce a reduced amount of pressure supplied to the PTO clutch 236 in order to slip the clutch 236. A greater current or voltage may induce approximately full pressure to the clutch 236. Other variations and aspects are contemplated by this variable control of the PTO assembly 312.

In another aspect or embodiment of the present disclosure, a geartrain (i.e., a direct mechanical drive without any hydraulic coupling), may include a PTO that causes or induces an audible rattle noise condition when it is not under a direct load due to backlash between interfacing gears. The noise may further be attributed to torque associated with the inertia of the unloaded geartrain and the periodic firing of the cylinders of an internal combustion engine or drive unit. By introducing a small amount of damping to the geartrain or system, the slipping of an electronically-controlled, hydraulic clutch of the PTO can reduce or eliminate the noise. The clutch may be positioned internally within the PTO, for example.

In addition, there are a variety of gear and clutch combinations as well as a variety of control methods by which this damping activity can be accomplished. The transmission or engine controller can be used for software memory and monitoring of the conditions under which this activity is controlled, or the accessory (e.g., PTO) can have it owns controller. The pressure to slip the clutch can be provided by a plurality of configurations of solenoids, or electric-over-hydraulic devices. The clutch design is structurally durable to allow for time during which it will slip at less than a full apply pressure. Conventional, carbon fiber friction plate material can be used in the design to provide desired durability of the clutch. There may be many different conditions under which the clutch slips due to a lower hydraulic pressure supplied thereto, but these conditions may be predefined as a set of instructions or algorithm in one of the controllers (e.g., transmission control unit) and thereby monitored electronically.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling a power take-off assembly, comprising:
providing a drive unit, a transmission including an output, a speed sensor, a controller including a memory unit and a processor, and the power take-off assembly including a clutch, a first solenoid and a second solenoid;
storing a first threshold in the memory unit;
determining a current input speed of the drive unit with the speed sensor;
comparing the current input speed to the first threshold;
controlling an amount of hydraulic pressure supplied to the clutch; and
engaging the clutch by energizing one of the first solenoid or the second solenoid.

2. The method of claim 1, wherein the controlling step is performed if the current input speed is less than the first threshold.

3. The method of claim 1, further comprising:
storing a second threshold in the memory unit of the controller;
determining a load induced on the drive unit; and
comparing the load to the second threshold.

4. The method of claim 3, wherein the controlling step is performed if the current input speed is less than the first threshold and the load is less than the second threshold.

5. The method of claim 1, wherein the controlling step comprises energizing one of the first solenoid or the second solenoid based on the comparing step.

6. The method of claim 1, wherein the controlling step comprises energizing the first solenoid to supply full hydraulic pressure to the clutch.

7. The method of claim 1, wherein the controlling step comprises energizing the second solenoid to supply partial hydraulic pressure to the clutch.

8. The method of claim 1, further comprising:
detecting if a signal is received from an operator control switch; and
performing the controlling and engaging steps if there is no detected signal received.

9. The method of claim 1, further comprising:
energizing one of the first solenoid and the second solenoid; and
de-energizing the other of the first solenoid and the second solenoid.

10. The method of claim 1, further comprising:
storing a set of instructions in the memory unit of the controller for slipping the clutch;
repeatedly performing the determining and comparing steps; and
executing the set of instructions with the processor so long as the current input speed remains below the first threshold.

11. A vehicle, comprising:
a drive unit for producing torque, the drive unit including an output;
a transmission including an input, a first output, and a second output, wherein the input is coupled to the output of the drive unit;
a controller including a memory unit and a processor, the controller electrically coupled to the transmission; and
a power take-off assembly coupled to the second output, the power take-off assembly including a clutch and a solenoid electrically coupled to the controller;
wherein, a set of instructions is stored in the memory unit of the controller, the set of instructions being executable by the processor to receive a current input speed of the drive unit, compare the current input speed to a first threshold, determine if the current input speed is less than the first threshold, fully energize or de-energize the solenoid, and operably control an amount of hydraulic pressure applied to the clutch.

12. The vehicle of claim 11, wherein the set of instructions stored in the memory unit are further executable by the processor to receive a load on the drive unit, compare the load to a second threshold, and determine if the load is less than the second threshold.

13. The vehicle of claim 11, further comprising an operator control switch electrically coupled to the controller, the operator control switch configured to be triggered for enabling and disabling the power take-off assembly;
wherein, the set of instructions stored in the memory unit are further executable by the processor to detect if a signal is received from the operator control switch and operably control the amount of hydraulic pressure applied to the clutch if no signal is detected.

14. The vehicle of claim 11, wherein the set of instructions stored in the memory unit are further executable by the processor to fully energize the solenoid to apply a maximum amount of hydraulic pressure to the clutch.

15. The vehicle of claim 11, wherein the set of instructions stored in the memory unit are further executable by the processor to energize a second solenoid to apply a reduced amount of hydraulic pressure to the clutch.

16. The vehicle of claim 11, wherein the power take-off assembly comprises:
an input shaft;
an output shaft;
a first drive gear rotatably driven by the second output;

a first driven gear rotatably coupled to the input shaft, wherein the first driven gear is rotatably driven by the first drive gear;

a second drive gear rotatably coupled to the input shaft; and a second driven gear rotatably coupled to the output shaft, wherein the second driven gear is rotatably driven by the second drive gear.

17. Power take-off assembly, comprising:

an input shaft configured to transfer torque to the power take-off assembly from a drive unit;

an output shaft having a coupler on one end;

a hydraulic clutch disposed between the input shaft and the output shaft, the hydraulic clutch having a fully engaged position, a partially engaged position, and a disengaged position;

a first solenoid having an open state where the first solenoid is fluidly coupled to the hydraulic clutch and having a closed state where the first solenoid is not fluidly coupled to the hydraulic clutch; and a second solenoid having an open state where the second solenoid is fluidly coupled to the hydraulic clutch and having a closed state where the second solenoid is not fluidly coupled to the hydraulic clutch;

wherein, when the hydraulic clutch is in the fully engaged position, the first solenoid is in the open state and the second solenoid is in the closed state.

18. The power take-off assembly of claim 17, wherein when the hydraulic clutch is in the partially engaged position, the second solenoid is in the open state and the first solenoid is in the closed state.

19. The power take-off assembly of claim 17, wherein when the hydraulic clutch is in the disengaged position, the first solenoid and the second solenoid are in the closed state.

20. The power take-off assembly of claim 17, further comprising:

a controller having a memory unit and a processor that is electronically coupled to the first solenoid and the second solenoid, the memory unit storing a threshold value; and a sensor electronically coupled to the controller and configured to measure the rotational speed of the input shaft;

wherein, the sensor communicates the rotational speed of the input shaft to the controller and the controller compares the rotational speed to the threshold and transitions the hydraulic clutch to either the fully engaged position, the partially engaged position, or the disengaged position based on the comparison.

* * * * *